United States Patent [19]

Benjamin et al.

[11] Patent Number: 4,939,765
[45] Date of Patent: Jul. 3, 1990

[54] INTERLOCK CIRCUIT FOR PREVENTING CORRUPTION OF TELEPHONE LINE SIGNALS

[75] Inventors: Dean L. Benjamin, Ventura; Wayne K. Wong, Camarillo, both of Calif.

[73] Assignee: Harris Corporation, Melbourne, Fla.

[21] Appl. No.: 440,830

[22] Filed: Nov. 24, 1989

Related U.S. Application Data

[63] Continuation of Ser. No. 344,401, Apr. 28, 1989, abandoned.

[51] Int. Cl.⁵ .......................... H04M 1/24; H04M 3/22
[52] U.S. Cl. ......................................... 379/29; 379/34; 379/21
[58] Field of Search ....................... 379/22, 24, 29, 34, 379/21

Primary Examiner—Stafford D. Schreyer
Attorney, Agent, or Firm—Evenson, Wands, Edwards, Lenahan & McKeown

[57] ABSTRACT

Corruption of communication signals on a telephone line by the direct (low impedance) interfacing of test equiupment to the line is precluded by a protective interlock circuit, which prevents the test set from seizing the line if data traffic is present. The interlock circuit is coupled between the line circuit to be accessed and the test equipment, and includes a multiple band frequency detector, which monitors the line for signals lying within (in and out-of-audio) frequency bands. Should the detector identify any traffic within its sensitivity range (out of the audio band) during the interval of a timing pulse produced by the closure of a switch, the logic level applied to combinational logic will change state and prevent the generation of a test set enabling signal. The test set enabling signal is normally coupled to a 'line-seize' transistor circuit within the test set, so that, without this enabling signal, the test set is effectively locked-out from the line and data cannot be corrupted. Should the frequency detector not have produced an out of audio band detection signal after the expiration of the timing pulse, the combinational logic circuit and an associated flip-flop generate an output signal for enabling the test equipment to seize the line. The flip-flop remains set and the logic level of the output signal is maintained until the line is no longer seized by the test equipment.

33 Claims, 2 Drawing Sheets

INTERLOCK CIRCUIT FOR PREVENTING CORRUPTION OF TELEPHONE LINE SIGNALS

This is a continuation of Application Ser. No. 344,401, filed 4/28/89, now abandoned.

FIELD OF THE INVENTIONS

The present invention relates to telephone line test circuits and is particularly directed to a lock-out interface circuit for preventing the connection of a telephone test set to a line to be tested from interfering with data traffic present on the line.

BACKGROUND OF THE INVENTIONS

In the course of maintenance and repair of telephone line circuits it is common practice for the craftsperson to couple a test set to the line, monitor the line for the presence of audible traffic and, in the absence of a detectable audio signal, place the test set in a low impedance "TALK" mode in order to use, test, or otherwise carry out communication capability tasks on the accessed circuit. If, during this procedure, the telephone line is carrying information signals (e.g. digital data traffic) that lie in a frequency range above the audio spectrum, the craftsperson will be unable to detect the transmission. As a consequence, when the craftsperson seizes the line, (by placing a low impedance across its tip and ring leads) there is the likelihood of contamination of the out-of-band digital data. Moreover, with conventional test sets it is possible to be in the low impedance mode at the time of connection to the circuit thereby interfering with all traffic which might be present.

SUMMARY OF THE INVENTIONS

In accordance with the present invention, the potential for corruption of any communication signals present on the telephone line by the connection by the direct interfacing of a craftsperson's test equipment to the line is obviated by a protective interlock circuit, which prevents the test set from seizing the line if data traffic is present. To this end the present invention is particularly directed to an interface circuit that is coupled between the telephone line circuit to be accessed (e.g. tip and ring leads) and the craftsperson's test equipment for controllably coupling a telephone line to line test equipment. The interface circuit includes a multiple band frequency detector, which is coupled to the telephone line and, when enabled by the operation of a first switch, monitors the line for the presence of communication signals lying within a prescribed plurality of (in and out-of-audio) frequency bands. Operation of the first switch also provides a timing pulse to a combinational logic circuit to which multiple outputs of the frequency detector are coupled. Should the detector identify any traffic within its sensitivity range (out-of-audio) during the interval of the timing pulse, the logic level on an output to the combinational logic will change state and prevent the generation of a test set enabling signal. The test set enabling signal is normally coupled to a 'line-seize' transistor circuit within the test set, so that, without this enabling signal, the craftsperson is effectively locked-out from the line and data traffic cannot be corrupted. Should the frequency detector not have produced a detection signal after the expiration of the timing pulse, the combinational logic circuit and an associated flip-flop generate an output signal for enabling the test equipment to seize the line. The flip-flop remains set and the logic level of the output signal is maintained until the line is no longer seized by the test equipment, or power is reset. Through the front end comparator circuitry, the interface circuit of the present invention ensures that the test set or other test equipment is always in the high impedance (on-hook) mode upon connection to the line. The flip-flop is reset with each on-hook condition, physical disconnection, or power-on condition.

The front-end frequency detector and associated logic may be coupled to the telephone line through an auxiliary relay circuit through which other test equipment may be coupled to the line in response to the output signal. The interface circuit may also be provided with a second switch that is logically coupled with the output (timing pulse) of the first switch, for providing a manual override or bypass of the frequency detector, thereby permitting the craftsperson the ability to gain 'hard' access to the line regardless of the presence of traffic.

DETAILED DESCRIPTIONS

Figure 1:
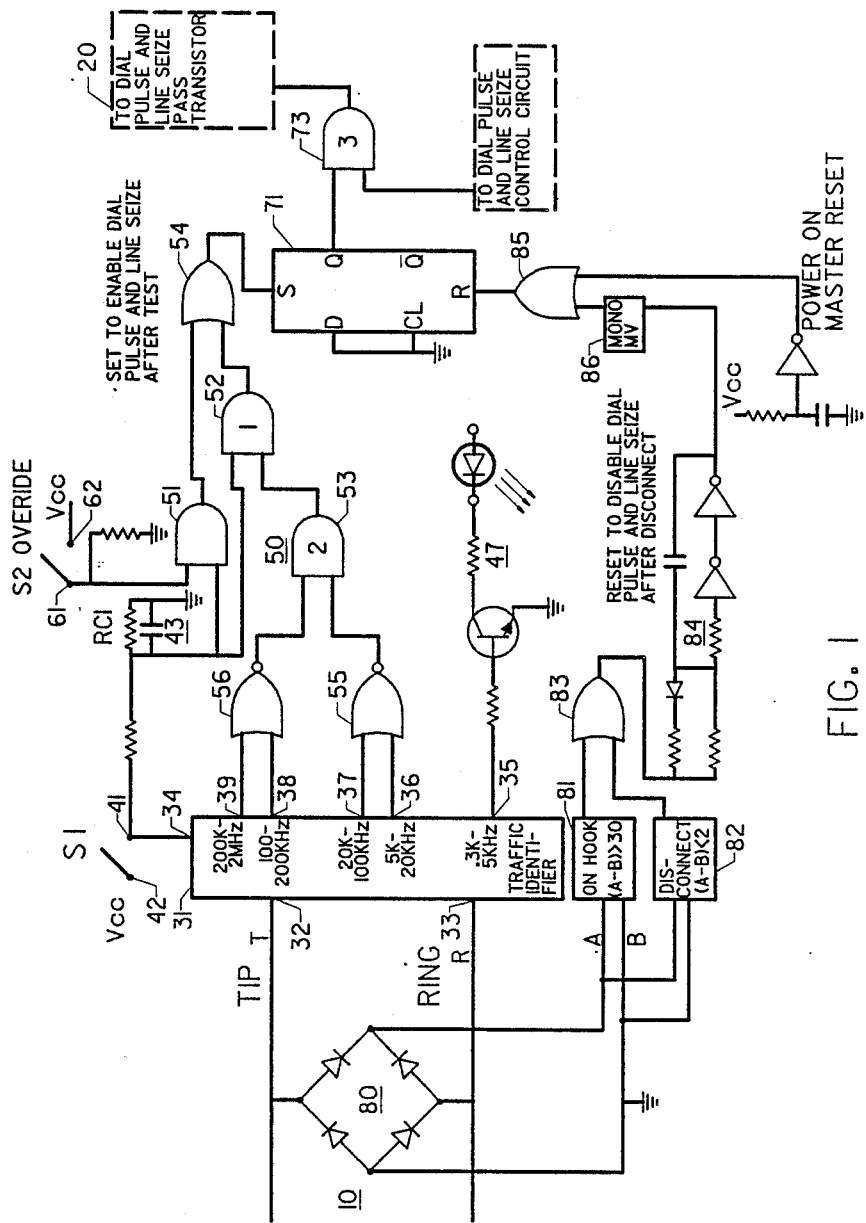
FIG. 1 is a diagrammatic illustration of a first embodiment of the interlock circuit of the present invention.

Referring now to FIG. 1, there is shown a diagrammatic illustration of a first embodiment of the interlock circuit of the present invention and the manner in which it is interfaced between a telephone line circuit, shown generally at 10, and downstream test set circuitry, shown at 20, through which a craftsperson may perform tasks on the line. Specifically, the front end component of the interlock circuit comprises a multifrequency detector 31 input ports 32 and 33 of which are is coupled to the respective tip (T) and ring (R) leads of line circuit 10 and an enable port 34 of which is coupled to a terminal 41 of a momentary switch S1. When closed, switch S1 couples a voltage (Vcc) supplied to a terminal 42 to port 34 and to a resistor-capacitor timing pulse generation circuit 43, which supplies a delay (timing) pulse to a first input of each of AND gates 51 and 52 within a combinational logic circuit 50. A second input of AND gate 51 is coupled to terminal 62 of a second momentary switch S2. When closed, switch S2 couples the voltage (Vcc) that is applied to terminal 62 to gate 51. The output of AND gate 51 is coupled to one input of an OR gate 54, the output of which is coupled to the SET input of flip-flop 71.

Frequency detector 31 may be formed in the manner of the frequency discriminator detector unit described in U.S. Pat. No. 4,777,645 entitled "Telephone Line Test and Display Circuit", issued Oct. 11, 1988 and assigned to the assignee of the present application. Unit 31 preferably contains a plurality of frequency discriminator circuits tuned to respective bands or ranges of frequencies (e.g. 300 Hz-5 kHz, 5 kHz -20 kHz, 20 kHz-100 kHz, 100 kHz 200 kHz and 100 kHz-2 MHz) and outputs of which are coupled over output lines 35-39. Like the unit described in the patent, all of the output lines, of which output line 35 is typical, provide an indication of the presence of signals in that range, via a visual display (e.g. LED circuit 47). The remaining output lines 36-39 are additionally coupled in pairs to NOR gates 55, 56, the outputs of which are coupled to the inputs of AND gate 53. The output of AND gate 53 is coupled to a second input of AND gate 52. The output of AND gate 52 is coupled to a second input of OR gate 54. Normally, the outputs of detector 31 are low, so that the output of AND gate 53 is high and the second input of AND gate 52 is high. When enabled by the closure of switch S1, detector 31 monitors the tip and ring leads for the presence of communication signals lying within its sensitivity range. Should a superaudio signal be present within one of its detection bands, the level on one of the output lines 36–39 will change state, causing the output of one of NOR gates 55, 56 to go low and thereby disabling AND gates 53 and 52.

The Q output of flip-flop 71 is coupled through an AND gate 73 to the control lead of a line seize pass transistor of the line seize circuit within the craftsperson's test equipment 20. A second input of AND gate 73 is coupled to the control circuit within the test equipment. When flip-flop 71 is set, the test equipment is enable to seize the line. When the line is no longer seized, either through a disconnect or hang-up, the output of one of a pair of comparator circuits 81 and 82, which are coupled to the telephone line via bridge 80, will change state, causing a hard reset signal to be applied through OR gate 83, dial pulse filter 84 monostable multivibrator 86 and one input of OR gate 85 to the RESET input of flip-flop 71. Monostable multivibrator 86 only allows positive level transitions from the comparator circuits 81 and 82 to reset flip-flop 71A separate (power-on) MASTER reset is coupled through a second input of OR gate 85 to the RESET input of flip-flop 71.

In operation, when multiple band frequency detector 31 is enabled by the closure of momentary switch S1, it monitors the line for the presence of communication signals (digital data traffic) lying within a prescribed plurality of (out-of-audio) frequency bands (the 5 kHz . . . 2 MHZ ranges shown). Closure of switch S1 also provides a timing pulse via delay circuit 43 to a first input of AND gate 52, to a second input of which output lines 36–39 of the frequency detector are logically coupled. Should detector 31 identify any traffic within its sensitivity range during the interval of the timing pulse provided by delay circuit 43, the logic level input to GATE 52 will go low and prevent flip-flop 71 from being set. As pointed out previously, unless flip-flop 71 is set, the line cannot be seized by the test equipment.

Assuming that the telephone line is free of above audio band traffic, then once the output voltage of timing pulse circuit 43 reaches the logic threshold of AND gate 52, its output goes high, setting flip-flop 71 and causing the generation of a test set enabling signal at its Q output. The test set enabling signal is normally coupled through AND gate 73 to a 'line-seize' transistor circuit (not shown) within test set 20, so as to normally prevent the craftsperson from directly seizing the line and thereby potentially corrupting data traffic. Flip-flop 71 remains set until the line is no longer seized by the test equipment. Namely, upon disconnect or hang-up, one of comparators 81, 82 will trigger, thereby resetting flip-flop 71 and terminating the line seize enable signal at its Q output.

To initiate the override feature, the craftsperson closes switches S1 and S2 simultaneously, thereby enabling both inputs of AND gate 51. Regardless of the presence or absence of high frequency traffic (as monitored by detector 31), a set logic level is coupled from AND gate 51 through OR gate 54 to the SET input of flip-flop 71.

Figure 2:
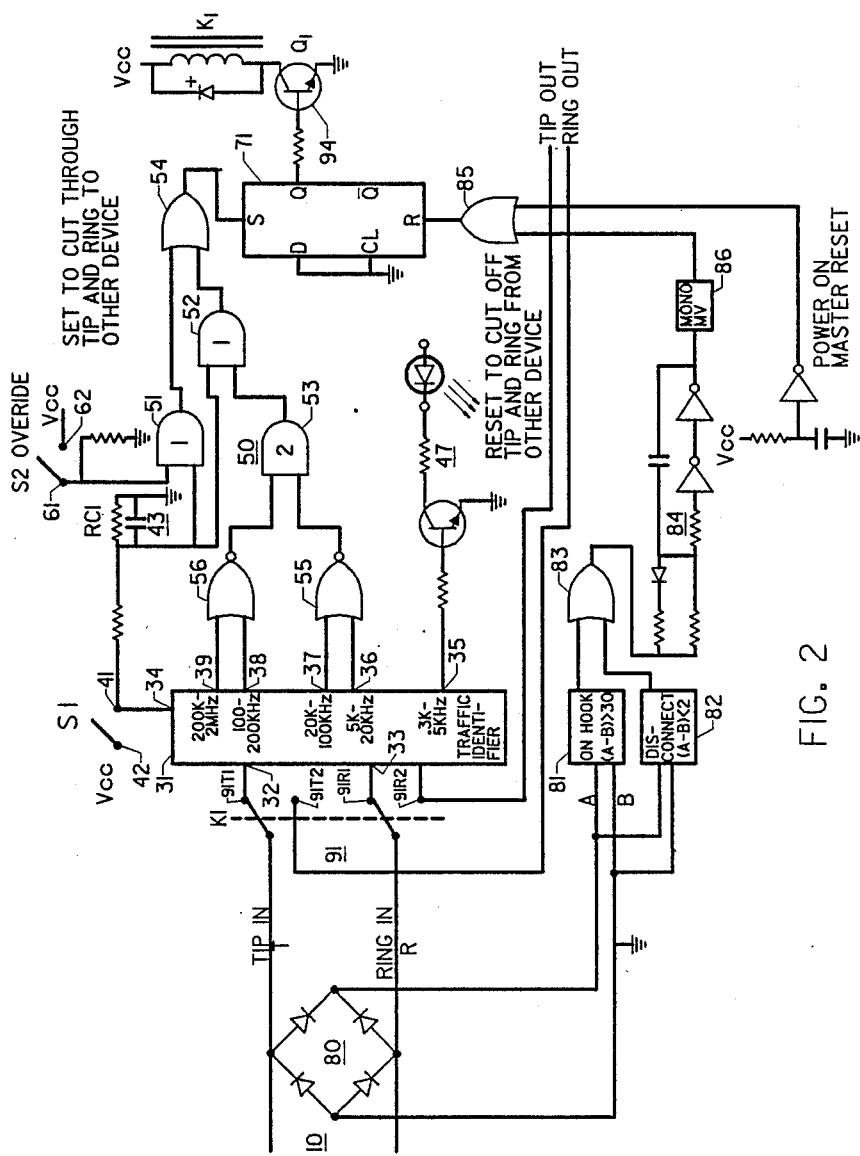
FIG. 2 diagrammatically illustrates a second embodiment of the invention.

In accordance with a second embodiment of the invention, shown in FIG. 2, frequency detector 31 may be coupled to the telephone line through the normally closed contacts 91T1 and 91R1 of an auxiliary relay circuit 91. Normally open contacts 91T2 and 91R2 are coupled by way of Tip and Ring output lines 92T and 92R to auxiliary test equipment. The Q output of flip-flop 71 is coupled to a drive transistor 94 for actuating relay circuit 91 and thereby changing the connections of the relay contacts. Operation of this embodiment of the invention is substantially the same as that described above. If, after closure of switch S1, none of the outputs of frequency detector 31 goes high, flip-flop 31 is set, thereby turning on drive transistor 94 and energizing relay 91, so as to couple the telephone line to the auxiliary equipment.

As will be appreciated from the foregoing description, the potential for corruption of high frequency, out-of-band data traffic, that may be present on a telephone line, by the direct interfacing (low impedance mode bridging) of a craftsperson's test equipment to the line is obviated in accordance with the present invention by a protective interlock circuit, which tests the line for such traffic and prevents the test set from seizing the line if data traffic is present. Full supervisory capability is also afforded by means of an override switch circuit, that enables a craftsperson to seize the line regardless of the presence of data traffic.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. An interface circuit for controllably coupling a telephone line to line test equipment comprising:
   first means, to which a telephone line is to be coupled, for controllably monitoring said line for the presence of communication signals on said line;
   second means, coupled to said first means, for causing said first means to monitor said line for the presence of communication signals on said line and, in the absence thereof, generating an output signal in response to which said line test equipment may cause said line to be seized.

2. An interface circuit according to claim 1, wherein said first means comprises means for monitoring said line for the presence of communication signals in respectively different frequency bands and providing an output in response to the presence of communication signals in any of said frequency bands.

3. An interface circuit according to claim 2, wherein said second means comprises switch means for generating an enabling signal in response to which said first means is enabled to monitor said line and gate means coupled to receive said enabling signal and the output of said first means and generating said output signal after the generation of said enabling signal by said switch means in the absence of communication signals on said line, but otherwise preventing the generation of said output signal.

4. An interface circuit according to claim 3, wherein said second means comprises means for maintaining the generation of said output signal until the line is no longer seized by said test equipment.

5. An interface circuit according to claim 1, further including third means for controllably coupling said test equipment to said line in response to said second means generating said output signal.

6. An interface circuit according to claim 5, wherein said second means comprises means for maintaining the generation of said output signal until the line is no longer seized by said test equipment and thereafter controllably decoupling said test equipment from said line.

7. An interface circuit according to claim 1, further comprising third means for causing said second means to generate said output signal irrespective of the operation of said first means.

8. An interface circuit according to claim 1, wherein said second means comprises first switch means for generating a first enabling signal in response to which said first means is enabled to monitor said line and gate means coupled to receive said first enabling signal and the output of said first means and generating said output signal after the generation of said first enabling signal by said first switch means in the absence of communication signals on said line, but otherwise normally preventing the generation of said output signal.

9. An interface circuit according to claim 8, further comprising third means for causing said second means to generate said output signal irrespective of the operation of said first means, said third means including second switch means for generating a second enabling signal, and wherein said gate means includes means, responsive to said first and second enabling signals, for causing said second means to generate said output signal.

10. An interface circuit for controllably coupling a telephone line to line test equipment comprising:
    first means, to which a telephone line is to be coupled, for controllably monitoring said line for the presence of communication signals lying within a prescribed plurality of frequency bands and producing respective detection signals in response to the presence of communication signals within respective ones of said frequency bands;
    second means coupled to said first means, for causing said first means to monitor said line for the presence of communication signals on said line and, upon said first means not having produced a detection signal, generating an output signal for enabling test equipment to seize said line.

11. An interface circuit according to claim 10, wherein said second means comprises switch means for generating a first enabling signal in response to which said first means is enabled to monitor said line, and gate means, coupled to said first means and responsive to said first enabling signal, for generating said output signal in the absence of the production of a detection signal by said first means, but otherwise preventing the generation of said output signal.

12. An interface circuit according to claim 11, wherein said second means comprises means for maintaining the generation of said output signal until the line is no longer seized by said test equipment.

13. An interface circuit according to claim 10, further including third means for controllably coupling said test equipment to said line in response to said second means generating said output signal.

14. An interface circuit according to claim 13, wherein said second means comprises means for maintaining the generation of said output signal until the line is no longer seized by said test equipment and thereafter controllably decoupling said test equipment from said line.

15. An interface circuit according to claim 11, further comprising third means for causing said second means to generate said output signal irrespective of the operation of said first means, said third means including second switch means for generating a second enabling signal, and wherein said gate means includes means, responsive to said first and second enabling signals, for causing said second means to generate said output signal.

16. A method of preventing the corruption of communication signals being transmitted over a telephone line in the course of coupling telephone line test equipment to said telephone line comprising the steps of:
    (a) monitoring said telephone line for the presence of communication signals lying within a prescribed plurality of frequency bands and producing respective detection signals in response to the presence of communication signals within respective ones of said frequency bands; and
    (b) upon step (a) not having produced a detection signal, generating an output signal for enabling said test equipment to seize said line.

17. A method according to claim 16, wherein step (b) includes controllably coupling said test equipment to said line in response to said output signal.

18. A method to claim 17, further including the step of (c) maintaining the generation of said output signal until the line is no longer seized by said test equipment and thereafter decoupling said test equipment from said line.

19. An interface circuit for controllably coupling a telephone line to line test equipment comprising:
    first means, to which a telephone line is to be coupled, for controllably monitoring a condition of said line representative of the use of said line without seizing said line; and
    second means, coupled to said first means, for causing said first means to monitor said line for a condition representative of the use of said line and providing an output indicative of whether or not said line may be seized by said line test equipment.

20. An interface circuit according to claim 19, wherein said first means comprises means for monitoring said line for the presence of communication signals and providing an output in responsive to the presence of communication signals.

21. An interface circuit according to claim 20, wherein said second means comprises means, coupled to said first means, for causing said first means to monitor said line for the presence of communication signals on said line and, in the absence thereof, generating an output signal in response to which said line test equipment may cause said line to be seized.

22. An interface circuit according to claim 21, wherein said first means comprises means for monitoring said line for the presence of communication signals in respectively different frequency bands and providing an output in response to the presence of communication signals in any of said frequency bands.

23. An interface circuit according to claim 22, wherein said second means comprises switch means for generating an enabling signal in response to which said first means is enabled to monitor said line and gate means coupled to receive said enabling signal and the output of said first means and generating said output signal after the generation of said enabling signal by said switch means in the absence of communication signals on said line, but otherwise preventing the generation of said output signal.

24. An interface circuit according to claim 23, wherein said second means comprises means for maintaining the generation of said output signal until the line is no longer seized by said test equipment.

25. An interface circuit according to claim 19, further including third means for controllably coupling said test equipment to said line in response to said second means providing said output.

26. An interface circuit according to claim 25, wherein said second means comprises means for providing said output until the line is no longer seized by said test equipment and thereafter controllably decoupling said test equipment from said line.

27. An interface circuit according to claim 19, further comprising third means for causing said second means to provide said output irrespective of the operation of said first means.

28. An interface circuit according to claim 20, wherein said second means comprises first switch means for generating a first enabling signal in response to which said first means is enabled to monitor said line and gate means coupled to receive said first enabling signal and the output of said first means and providing said output after the generation of said first enabling signal by said first switch means in the absence of communication signals on said line, but otherwise normally preventing said output signal from being provided.

29. An interface circuit according to claim 28, further comprising third means for causing said second means to provide said output irrespective of the operation of said first means, said third means including second switch means for generating a second enabling signal, and within said gate means includes means, responsive to said first and second enabling signals, for causing said second means to generate said output signal.

30. A method of controllably coupling a telephone line to line test equipment comprising the steps of:
  (a) monitoring, without seizing, said telephone line for the presence of a condition of representative of the use of said line and
  (b) providing an output indicative of whether or not said line may be seized by said line test equipment.

31. A method according to claim 30, wherein step (a) comprises monitoring said line for the presence of communication signals and providing an output in response to the presence of communication signals.

32. A method according to claim 31, wherein step comprises monitoring said line for the presence of communication signals on said line and step (b) comprises, in the absence of step (a) detecting the presence of communication signals on said line, generating an output signal in response to which said line test equipment may cause said lien to be seized.

33. A method according to claim 32, wherein step comprises monitoring said line for the presence of communication signals in respectively different frequency bands and providing an output in response to the presence of communication signals in any of said frequency bands.

* * * * *